United States Patent
Ford et al.

(10) Patent No.: US 6,228,957 B1
(45) Date of Patent: May 8, 2001

(54) PROCESS FOR PRODUCING POLYETHLENE

(75) Inventors: Randal Ray Ford; William Albert Ames; Kenneth Alan Dooley; Jeffrey James Vanderbilt; Alan George Wonders, all of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/251,356

(22) Filed: Feb. 17, 1999

Related U.S. Application Data

(60) Provisional application No. 60/075,106, filed on Feb. 18, 1998.

(51) Int. Cl.$^7$ ............................. C08F 4/10; C08F 10/04; C08F 110/04
(52) U.S. Cl. .................................. 526/123.1; 526/124.3; 526/125.2; 526/348.5; 526/348.6; 526/901; 526/903; 502/103; 502/117
(58) Field of Search ............................. 526/123.1, 124.3, 526/125.1, 125.3, 128, 89, 348.5, 348.6, 901, 903, 125.2; 502/103, 117

(56) References Cited

U.S. PATENT DOCUMENTS

| | | |
|---|---|---|
| Re. 33,683 | 9/1991 | Allen et al. . |
| 3,113,115 | 12/1963 | Ziegler et al. . |
| 3,354,139 * | 11/1967 | Vandenberg .......................... 260/94.9 |
| 3,594,330 | 7/1971 | Delbouille et al. . |
| 3,644,318 | 2/1972 | Diedrich et al. . |
| 3,676,415 | 7/1972 | Diedrich et al. . |
| 3,709,853 | 1/1973 | Karapinka . |
| 3,917,575 | 11/1975 | Matsuura et al. . |
| 4,003,712 | 1/1977 | Miller . |
| 4,011,382 | 3/1977 | Levine et al. . |
| 4,012,573 | 3/1977 | Trieschmann et al. . |
| 4,076,698 | 2/1978 | Anderson et al. . |
| 4,105,847 | 8/1978 | Ito et al. . |
| 4,148,754 | 4/1979 | Strobel et al. . |
| 4,187,385 | 2/1980 | Iwao et al. . |
| 4,256,866 | 3/1981 | Karayannis et al. . |
| 4,293,673 | 10/1981 | Hamer et al. . |
| 4,296,223 | 10/1981 | Berger . |
| 4,298,713 | 11/1981 | Morita et al. . |
| 4,302,565 | 11/1981 | Goeke et al. . |
| 4,302,566 * | 11/1981 | Karol et al. .......................... 526/125 |
| 4,311,752 | 1/1982 | Diedrich et al. . |
| 4,363,904 | 12/1982 | Fraser et al. . |
| 4,415,714 | 11/1983 | Mack . |
| 4,481,301 | 11/1984 | Nowiis et al. . |
| 4,543,399 | 9/1985 | Jenkins et al. . |
| 4,684,703 | 8/1987 | Wagner et al. . |
| 4,701,505 * | 10/1987 | Fujii et al. .......................... 526/125 |
| 4,882,400 | 11/1989 | Dumain et al. . |
| 4,981,930 | 1/1991 | Funabashi et al. . |
| 5,055,535 | 10/1991 | Spitz et al. . |
| 5,352,749 | 10/1994 | DeChellis et al. . |
| 5,410,002 | 4/1995 | Govoni et al. . |
| 5,470,812 | 11/1995 | Mink et al. . |
| 5,541,270 | 7/1996 | Chinh et al. . |

FOREIGN PATENT DOCUMENTS

| | | |
|---|---|---|
| 592394 | 6/1987 | (AU) . |
| 839380 | 9/1976 | (BE) . |
| 991798 | 6/1976 | (CA) . |
| 0 703 246 A1 | 3/1996 | (EP) . |
| 0 529 977 B1 | 4/1998 | (EP) . |
| 820 773 | 9/1959 | (GB) . |

OTHER PUBLICATIONS

Chemical and Engineering News, 63 (5), 27, 1985.
Patent Abstract of Japan, vol. 10, No. 148 & JP 61 007306 A (Tokuyama Soda KK), Jan. 14, 1986.

* cited by examiner

Primary Examiner—David W. Wu
Assistant Examiner—R. Harlan
(74) Attorney, Agent, or Firm—Jonathan D. Wood; Bernard J. Graves, Jr.; Harry J. Gwinnell

(57) ABSTRACT

A novel process for producing homopolymers and copolymers of ethylene which involves contacting ethylene and/or ethylene and at least one or more olefin comonomer(s) under polymerization conditions with a Ziegler-Natta type catalyst substantially free of internal electron donor, trimethylaluminum and at least one compound containing at least one carbon-oxygen-carbon linkage (C—O—C) of the formula $R^1$—O(—$R^2$—O)$_n$—$R^3$ where n ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure. Also provided are films and articles produced therefrom.

24 Claims, No Drawings

PROCESS FOR PRODUCING POLYETHLENE

CROSS-REFERENCE TO RELATED APPLICATION

This application claims priority under 35 U.S.C. §119(e) to U.S. provisional application Ser. No. 60/075,106, filed Feb. 18, 1998.

FIELD OF INVENTION

The present invention relates to a polymerization process for the production of a polyethylene. Preferably the polyethylene has a reduced level of extractables. Films produced from the polyethylene are characterized by having improved strength properties.

BACKGROUND OF INVENTION

Polyethylene polymers are well known and are useful in many applications. In particular, linear polyethylene polymers possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polyethylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta type catalyst systems for the polymerization of olefins are well known in the art and have been known at least since the issuance of U.S. Pat. No. 3,113,115. Thereafter, many patents have been issued relating to new or improved Ziegler-Natta type catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and U.S. Pat. No. Re. 33,683.

These patents disclose Ziegler-Natta type catalysts that are well known as typically consisting of a transition metal component and a co-catalyst that is typically an organoaluminum compound. Optionally used with the catalyst are activators such as halogenated hydrocarbons and activity modifiers such as electron donors.

The use of halogenated hydrocarbons with Ziegler-Natta type polymerization catalysts in the production of polyethylene is disclosed in U.S. Pat. No. 3,354,139 and European Patent Nos. EP 0 529 977 B1 and EP 0 703 246 A1. As disclosed, the halogenated hydrocarbons may reduce the rate of ethane formation, improve catalyst efficiency, or provide other effects. Typical of such halogenated hydrocarbons are monohalogen and polyhalogen substituted saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known, in the polymerization of olefins, particularly where Ziegler-Natta type catalysts are employed, to utilize, optionally, electron donors. Such electron donors often aid in increasing the efficiency of the catalyst and/or in controlling the stereospecificity of the polymer when an olefin, other than ethylene, is polymerized. Electron donors, typically known as Lewis Bases, when employed during the catalyst preparation step are referred to as internal electron donors. Electron donors are utilized other than during the catalyst preparation step are referred to as external electron donors. For example, the external electron donor may be added to the preformed catalyst, to the prepolymer, and/or to the polymerization medium.

The use of electron donors in the field of propylene polymerization is well known and is primarily used to reduce the atactic form of the polymer and increase the production of the isotactic polymers. The use of electron donors generally improves the productivity of the catalyst in the production of isotactic polypropylene. This is shown generally in U.S. Pat. No. 4,981,930.

In the field of ethylene polymerization, where ethylene constitutes at least about 70% by weight of the total monomers present in the polymer, electron donors are utilized to control the molecular weight distribution (MWD) of the polymer and the activity of the catalyst in the polymerization medium. Exemplary patents describing the use of internal electron donors in producing linear polyethylene are U.S. Pat. Nos. 3,917,575; 4,187,385, 4,256,866; 4,293,673; 4,296,223; U.S. Pat. No. Re. 33,683; U.S. Pat. Nos. 4,302, 565; 4,302,566; and 5,470,812. The use of an external monoether electron donor, such as tetrahydrofuran (THF), to control molecular weight distribution is shown in U.S. Pat. No. 5,055,535; and the use of external electron donors to control the reactivity of catalyst particles is described in U.S. Pat. No. 5,410,002.

Illustrative examples of electron donors include carboxylic acids, carboxylic acid esters, alcohols, ethers, ketones, amines, amides, nitriles, aldehydes, thioethers, thioesters, carbonic esters, organosilicon compounds containing oxygen atoms, and phosphorus, arsenic or antimony compounds connected to an organic group through a carbon or oxygen atom.

SUMMARY OF THE INVENTION

The polymerization process of the present invention comprises the introduction into a polymerization medium containing ethylene and optionally other olefin(s), a Ziegler-Natta type polymerization catalyst substantially free of any internal electron donor, at least one compound containing at least one carbon-oxygen-carbon linkage (C—O—C) of the formula $R^1$—O(—$R^2$—O)$_n$—$R^3$ were n ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, as an external electron donor, and trimethylaluminum (TMA) as a co-catalyst. Optionally a halogenated hydrocarbon compound can be employed in the polymerization medium. The external electron donor as defined herein and/or the TMA may be added to the polymerization medium in any manner. The external electron donor as defined herein and/or the TMA may be added to the catalyst just prior to addition to the polymerization medium, or added separately from the catalyst to the polymerization medium in any manner known in the art. For example, the external electron donor as defined herein may optionally be premixed with the TMA co-catalyst.

If a gas phase fluidized bed process is utilized for polymerization of the ethylene, it may be advantageous to add the external electron donor as defined herein prior to the heat removal means, e.g., the heat exchanger, to slow the rate of fouling of said heat removal means.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The present inventors have unexpectedly discovered that a particular combination of a Ziegler-Natta catalyst substantially free of any internal electron donor, trimethylaluminum (TMA) as co-catalyst and at least one compound containing at least one carbon-oxygen-carbon linkage (C—O—C) of the formula $R^1$—O(—$R^2$—O)$_n$—$R^3$ where n ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein $R^1$, $R^2$ and/or $R^3$ can be linked and form part of a cyclic or polycyclic structure, as an external electron donor, makes it possible to produce a polyethylene in an improved manner. Preferably the resultant polyethylene has a reduced level of extractables. Furthermore, films produced from these polyethylenes unexpectedly have high impact resistance as typified by Dart Impact values and have a good balance of machine direction (MD) and transverse direction (TD) tear values.

The compound used herein as an external electron donor is any compound containing at least one carbon-oxygen-carbon linkage (C—O—C) of the formula $R^1$—O(—$R^2$—O)$_n$—$R^3$ where n ranges from 0 to 30, and $R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements, and further wherein, $R^1$, $R^2$ and/or $R^3$ can be linked and form part of a cyclic or polycyclic structure.

Exemplary of the $R^1$, $R^2$ and $R^3$ groups suitable for use herein are $C_{1-30}$ alkyl, $C_{2-30}$ alkenyl, $C_{4-30}$ dienyl, $C_{3-30}$ cycloalkyl, $C_{3-30}$ cycloalkenyl, $C_{4-30}$ cyclodienyl, $C_{6-18}$ aryl, $C_{7-30}$ aralkyl and $C_{7-30}$ alkaryl. Also exemplary are hydrocarbons containing from 1 to 30 carbon atoms and from 1 to 30 heteroatoms of an element, or mixtures thereof, from Groups 13, 14, 15, 16 and 17 of the Periodic Table of Elements such as, for example, $B_{1-30}$ borohydrocarbons, $Si_{1-30}$ silahydrocarbons, $P_{1-30}$ phosphahydrocarbons, $S_{1-30}$ thiahydrocarbons, $Cl_{1-30}$ chlorohydrocarbons and halogenated hydrocarbons containing mixtures of halogens.

It is also suitable to utilize herein as the external electron donor, mixtures of compounds having the above formula.

Exemplary of compounds that may be used herein as external electron donors are compounds containing one C—O—C linkage where n=0, such as alkyl, alkenyl, dienyl and aryl substituted compounds of the formula $R^1$—O—$R^3$. Specific examples are dimethyl ether; diethyl ether; dipropyl ether; diisopropyl ether; dibutyl ether; dipentyl ether; dihexyl ether; dioctyl ether; diisoamyl ether; di-tert-butyl ether; diphenyl ether; dibenzyl ether; divinyl ether; diallyl ether; dicyclopropyl ether; dicyclopentyl ether; dicyclohexyl ether; allyl methyl ether; allyl ethyl ether; allyl cyclohexyl ether; allyl phenyl ether; allyl benzyl ether; allyl 2-tolyl ether; allyl 3-tolyl ether; benzyl methyl ether; benzyl ethyl ether; benzyl iosamyl ether; benzyl chloromethyl ether; benzyl cyclohexyl ether; benzyl phenyl ether; benzyl 1-naphthyl ether; benzyl 2-naphthyl ether; butyl methyl ether; butyl ethyl ether; sec-butyl methyl ether; tert-butyl methyl ether; butyl cyclopentyl ether; butyl 2-chloroethyl ether; cyclopentyl methyl ether; cyclohexyl ethyl ether; cyclohexyl vinyl ether; tert-amyl methyl ether; sec-butyl ethyl ether; tert-butyl ethyl ether; tert-amyl ethyl ether; cyclododecyl methyl ether; bis(3-cyclopenten-1-yl) ether; 1-methoxy-1,3-cyclohexadiene; 1-methoxy-1,4-cyclohexadiene; chloromethyl methyl ether; chloromethyl ethyl ether; bis(2-tolyl) ether; trimethylsilylmethyl methyl ether; bis(trimethylsilylmethyl) ether; bis(2,2,2-trifluoroethyl) ether; benzyl 3-bromopropyl ether; benzyl 3-bromo-2-chloropropyl ether; dimethyl 2-methoxyethyl borate; dimethyl methoxymethyl borate; dimethoxy-2-methoxyethylborane; diphenyl-2-methyoxyethylphosphine; diphenylmethoxymethylphosphine; 2-(2-thienyl)ethyl ethyl ether; 2-(2-thienyl)ethyl methyl ether; 2-(3-thienyl)ethyl ethyl ether; 2-(3-thienyl)ethyl methyl ether; 2-(2-methoxymethyl)-1,3,2-dioxaphospholane; 1-(2-methoxyethyl)pyrrole; 1-(2-methoxyethyl)pyrazole; 1-(2-methoxyethyl)imidazole; 2-(2-methoxyethyl)pyridine; bis (3-tolyl) ether; bis(1-naphthyl) ether; bis(2-naphthyl) ether; allyl 1-naphthyl ether; allyl 2-naphthyl ether; benzyl 2-tolyl ether; benzyl 3-tolyl ether; ethyl phenyl ether; ethyl 2-tolyl ether; ethyl 3-tolyl ether; ethyl 1-naphthyl ether; ethyl 2-naphthyl ether; methyl phenyl ether; methyl 2-tolyl ether; methyl 3-tolyl ether; methyl 1-naphthyl ether; methyl 2-naphthyl ether; 2-ethoxy-1-methylpyrrole; 3-methoxy-1-methylpyrrole; 2-ethoxythiophene; 3-methoxythiophene; 3-methoxy-1-methylpyrazole; 4-methoxy-1-methylpyrazole; 5-methoxy-1-methylpyrazole; 2-methoxy-1-methylimidazole; 4-methoxy-1-methylimidazole; 5-methoxy-1-methylimidazole; 3-methoxy-1-phenylpyrazole; 4-methoxy-1-phenylpyrazole; 5-methoxy-1-phenylpyrazole; 2-methoxy-1-phenylimidazole; 4-methoxy-1-phenylimidazole; 5-methoxy-1-phenylimidazole; 4-methoxy-1-methyl-1,2,3-triazole; 5-methoxy-1-methyl-1,2,3-triazole; 4-methoxy-1-phenyl-1,2,3-triazole; 5-methoxy-1-phenyl-1,2,3-triazole; 3-methoxy-1-methyl-1,2,4-triazole; 5-methoxy-1-methyl-1,2,4-triazole; 3-methoxy-1-phenyl-1,2,4-triazole; 5-methoxy-1-phenyl-1,2,4-triazole; 5-methoxy-1-methyltetrazole; 5-methoxy-1-phenyltetrazole; 3-methoxyisoxazole; 4-methoxyisoxazole; 5-methoxyisoxazole; 3-methoxy-1,2,4-oxadiazole; 5-methoxy-1,2,4-oxadiazole; 3-methoxyisothiazole; 4-methoxyisothiazole; 5-methoxyisothiazole; 2-methoxythiazole; 4-methoxythiazole; 5-methoxythiazole; 2-methoxypyridine; 3-methoxypyridine; 4-methoxypyridine; 3-methoxypyridazine; 4-methoxypyridazine; 2-methoxypyrimidine; 4-methoxypyrimidine; 5-methoxypyrimidine; 2-methoxypyrazine; 3-methoxy-1,2,4-triazine; 5-methoxy-1,2,4-triazine; 6-methoxy-1,2,4-triazine; 2-methoxy-1,3,5-triazine and the like. Also exemplary are $C_{2-20}$ cyclic compounds where $R^1$ and $R^3$ are linked and form part of a cyclic or polycyclic structure such as, for example, ethylene oxide; propylene oxide; 1,2-epoxybutane; cyclopentene oxide; epichlorohydrin; trimethylene oxide; 3,3-dimethyloxetane; furan; 2,3-dihydrofuran; 2,5-dihydrofuran; tetrahydrofuran; 2-methyltetrahydrofuran; 2,5-dimethyltetrahydrofuran; 4,5-dihydro-2-methylfuran; 2-methylfuran; 2,5-dimethylfuran; 3-bromofuran; 2,3-benzofuran; 2-methylbenzofuran; dibenzofuran; phthalan; xanthene; 1,2-pyran; 1,4-pyran; tetrahydropyran; 3-methyltetrahydropyran; 4-chlorotetrahydropyran; chroman; isochroman; oxocane; 2,3-epoxybutane; 1,2-epoxybut-3-ene; styrene oxide; 2-ethylfuran; 2-tert-butylfuran; 2,3-dimethylfuran; 2,3-dihydrobenzofuran; dimethyl 3-furylmethyl borate; 2-trimethylsilylfuran; 3-trimethylsilylfuran; oxazole; 1,3,4-oxadiazole; 3,4-dichloro-1,2-epoxybutane; 3,4-dibromo-1,2-epoxybutane and the like.

Exemplary compounds containing more than one C—O—C linkage include alkyl, alkenyl, dienyl and aryl substituted compounds of the formula $R^1$—O(—$R^2$—O)$_n$—$R^3$ where n ranges from 1 to 30. Specific examples are, dimethoxymethane; 1,1-dimethoxyethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; ethylene glycol diethyl ether; ethylene glycol divinyl ether; ethylene glycol diphenyl ether; ethylene glycol tert-butyl methyl ether; ethylene glycol tert-butyl ethyl ether; di(ethylene glycol) dimethyl ether; di(ethylene glycol) diethyl ether; di(ethylene glycol) dibutyl ether; di(ethylene glycol) tert-butyl methyl ether; tri(ethylene glycol) dimethyl ether; tri(ethylene glycol) diethyl ether; tetra(ethylene glycol) dimethyl ether; tetra(ethylene glycol) diethyl ether; ethylene glycol bis(trimethylsilylmethyl) ether; di(ethylene glycol) methyl trimethylsilyl ether; tris(2-methoxyethyl) borate; ethylene glycol chloromethyl bromomethyl ether; 2-(2-ethylhexyl)-1,3-dimethoxypropane; 2-isopropyl-1,3-dimethoxypropane; 2-butyl-1,3-dimethoxypropane; 2-sec-butyl-1,3-dimethoxypropane; 2-tert-butyl-1,3-dimethoxypropane; 2-cyclohexyl-1,3-dimethoxypropane; 2-phenyl-1,3-dimethoxypropane; 2-cumyl-1,3-dimethoxypropane; 2-(2-phenylethyl)-1,3-dimethoxypropane; 2-(2-cyclohexylethyl)-1,3-dimethoxypropane; 2-(p-chlorophenyl)-1,3-dimethoxypropane; 2-(p-fluorophenyl)-1,3-dimethoxypropane; 2-(diphenylmethyl)-1,3-dimethoxypropane; 2,2-dicyclohexyl-1,3-dimethoxypropane; 2,2-diethyl-1,3-dimethoxypropane; 2,2-dipropyl-1,3-dimethoxypropane; 2,2-diisopropyl-1,3-dimethoxypropane; 2,2-dibutyl-1,3-dimethoxypropane; 2,2-diisobutyl-1,3-dimethoxypropane; 2-methyl-2-ethyl-1,3-dimethoxypropane; 2-methyl-2-propyl-1,3-dimethoxypropane; 2-methyl-2-butyl-1,3-dimethoxypropane; 2-methyl-2-benzyl-1,3-dimethoxypropane; 2-methyl-2-methylcyclohexyl-1,3-dimethoxypropane; 2-isopropyl-2-isopentyl-1,3-dimethoxypropane; 2,2-bis(2-cyclohexylmethyl)-1,3-dimethoxypropane and the like. Also exemplary are $C_{3-20}$ cyclic compounds were $R^1$, $R^2$ and/or $R^3$ are linked and form part of a cyclic or polycyclic structure. Specific examples are 2,5-dimethoxyfuran; 2-methoxyfuran; 3-methoxyfuran; 2-methoxytetrahydropyran; 3-methoxytetrahydropyran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 2-vinyl-1,3-dioxolane; 2-chloromethyl-1,3-dioxolane; 2-methoxy-1,3-dioxolane; 1,4-dioxaspiro[4.4]non-6-ene; 1,4,9,12-tetraoxadispiro(4.2.4.2)tetradecane; 1,3-dioxane; 1,4-dioxane; 4-methyl-1,3-dioxane; 1,3,5-trioxane; 2,4,8,10-tetraoxaspiro(5.5) undecane; 12-crown-4; 15-crown-5; cis-4,7-dihydro-1,3-dioxepin; 1,7-dioxaspiro(5.5)undecane; 3,4-epoxytetrahydrofuran; 2,2-dimethyl-4-vinyl-1,3-dioxolane; tri-2-furylphosphine; 2-trimethylsilyl-1,3-dioxolane; 2-(3-thienyl)-1,3-dioxolane; 2-bromochloromethyl-1,3-dioxolane; 2-methoxyoxazole; 4-methoxyoxazole; 5-methoxyoxazole; 2-methoxy-1,3,4-oxadiazole and the like.

Preferred for use herein as external electron donors are dimethyl ether; diethyl ether; dipropyl ether; diisopropyl ether; dibutyl ether; diisoamyl ether; di-tert-butyl ether; diphenyl ether; dibenzyl ether; divinyl ether; butyl methyl ether; butyl ethyl ether; sec-butyl methyl ether; tert-butyl methyl ether; cyclopentyl methyl ether; cyclohexyl ethyl ether; tert-amyl methyl ether; sec-butyl ethyl ether; chloromethyl methyl ether; trimethylsilylmethyl methyl ether; bis(trimethylsilylmethyl) ether; bis(2,2,2-trifluoroethyl) ether; methyl phenyl ether; ethylene oxide; propylene oxide; 1,2-epoxybutane; cyclopentane oxide; epichlorohydrin; furan; 2,3-dihydrofuran; 2,5-dihydrofuran; tetrahydrofuran; 2-methyltetrahydrofuran; 2,5-dimethyltetrahydrofuran; 2-methylfuran; 2,5-dimethylfuran; tetrahydropyran; 1,2-epoxybut-3-ene; styrene oxide; 2-ethylfuran; oxazole; 1,3,4-oxadiazole; 3,4-dichloro-1,2-epoxybutane; 3,4-dibromo-1,2-epoxybutane; dimethoxymethane; 1,1-dimethoxyethane; 1,1,1-trimethoxymethane; 1,1,1-trimethoxyethane; 1,1,2-trimethoxyethane; 1,1-dimethoxypropane; 1,2-dimethoxypropane; 2,2-dimethoxypropane; 1,3-dimethoxypropane; 1,1,3-trimethoxypropane; 1,4-dimethoxybutane; 1,2-dimethoxybenzene; 1,3-dimethoxybenzene; 1,4-dimethoxybenzene; ethylene glycol dimethyl ether; di(ethylene glycol) dimethyl ether; di(ethylene glycol) diethyl ether; di(ethylene glycol) dibutyl ether; di(ethylene glycol) tert-butyl methyl ether; tri(ethylene glycol) dimethyl ether; tri(ethylene glycol) diethyl ether; tetra(ethylene glycol) dimethyl ether; 2,2-dimethyl-1,3-dimethoxypropane; 2-methyl-2-ethyl-1,3-dimethoxypropane; 2-methoxyfuran; 3-methoxyfuran; 1,3-dioxolane; 2-methyl-1,3-dioxolane; 2,2-dimethyl-1,3-dioxolane; 2-ethyl-2-methyl-1,3-dioxolane; 2,2-tetramethylene-1,3-dioxolane; 2,2-pentamethylene-1,3-dioxolane; 1,3-dioxane; 1,4-dioxane; 4-methyl-1,3-dioxane; 1,3,5-trioxane and 3,4-epoxytetrahydrofuran.

Most preferred for use herein as the external electron donor are tetrahydrofuran, diethyl ether, dipropyl ether, diisopropyl ether, dibutyl ether, tert-butyl methyl ether, dioctyl ether, trimethylene oxide and tetrahydropyran.

The polymerization process of the present invention may be carried out using any suitable process. For example, there may be utilized polymerization in suspension, in solution, in super-critical or in the gas phase media. All of these polymerization processes are well known in the art.

A particularly desirable method for producing polyethylene polymers according to the present invention is a gas phase polymerization process preferably utilizing a fluidized bed reactor. This type reactor and means for operating the reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrailed particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 110° C. In general, the reactor temperature is operated at the highest temperature that is feasible taking into account the sintering temperature of the polymer product within the reactor.

The process of the present invention is suitable for the production of homopolymers of ethylene and/or copolymers, terpolymers, and the like, of ethylene and at least one or more other olefins. Preferably the olefins are alpha-olefins. The olefins, for example, may contain from 3 to 16 carbon atoms. Particularly preferred for preparation herein by the process of the present invention are linear polyethylene. Such linear polyethylenes are preferably linear homopolymers of ethylene and linear copolymers of ethylene and at least one alpha-olefin wherein the ethylene content is at least about 70% by weight of the total monomers involved. Exemplary alpha-olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of linear polyethylenes containing long chain branching may occur.

The polymerization reaction of the present invention is carried out in the presence of a Ziegler-Natta type catalyst. In the process of the invention, the catalyst can be introduced in any manner known in the art. For example, the catalyst can be introduced directly into the polymerization medium in the form of a solution, a slurry or a dry free flowing powder. The catalyst can also be used in the form of a deactivated catalyst, or in the form of a prepolymer obtained by contacting the catalyst with one or more olefins in the presence of a co-catalyst. In the present invention, the Ziegler-Natta type catalyst utilized is substantially free of any internal electron donor. The term, substantially free of any internal electron donor, as used herein, means that the Ziegler-Natta type catalyst can contain an internal electron donor in an amount represented by a molar ratio of electron donor to transition metal compound from 0:1 to less than 1:1.

The Ziegler-Natta catalysts are well known in the industry. The Ziegler-Natta catalysts in the simplest form are comprised of a transition metal compound and an organometallic co-catalyst compound. The method of the transition metal compound is a metal of Groups 4, 5, 6, 7, 8, 9 and 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and chloride. Such magnesium and chlorine containing catalysts may be prepared by any manner known in the art.

The co-catalyst added to the polymerization medium of the present invention is trimethylaluminum (TMA).

In the event that a prepolymerized form of the catalyst is to be employed then the organometallic co-catalyst compound used to form the prepolymer can be any organometallic compound containing a metal of Groups 1, 2, 11, 12, 13 and 14 of the above described Periodic Table of the Elements. Exemplary of such metals are lithium, magnesium, copper, zinc, boron, silicon and the like. However, when a prepolymer is employed, TMA is still utilized as the co-catalyst in the polymerization medium.

The catalyst system may contain convention components in addition to the transition metal component, the external electron donor defined herein and the TMA co-catalyst component. For example, there may be added any magnesium compound known in the art, any halogenated hydrocarbon(s), and the like.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyethylene.

In carrying out the polymerization process of the present invention, TMA is added to the polymerization medium in any amount sufficient to effect production of the desired polyethylene. It is preferred to incorporate the TMA in a molar ratio of TMA to transition metal component of the Ziegler-Natta catalyst ranging from about 1:1 to about 100:1. In a more preferred embodiment, the molar ratio of TMA to transition metal component ranges from about 1:1 to about 50:1.

In carrying out the polymerization process of the present invention the external electron donor is added is any manner. For example, the external electron donor may be added to the preformed catalyst, to the prepolymer during the prepolymerization step, to the preformed prepolymer and/or to the polymerization medium. The external electron donor may optionally be premixed with the TMA co-catalyst. The external electron donor is added in any amount sufficient to effect production of the desired polyethylene. It is preferred to incorporate the external electron donor in a molar ratio of external electron donor to transition metal component of the Ziegler-Natta catalyst ranging from about 0.01:1 to about 100:1. In a more preferred embodiment, the molar ratio of external electron donor to transition metal component ranges from about 0.1:1 to about 50:1.

In carrying out the polymerization process of the present invention, there may be added other conventional additives generally utilized in processes for polymerizing olefins.

Specifically there may be added any halogenated hydrocarbon, including those mentioned hereinbefore, and preferably, chloroform. The motor ratio of halogenated hydrocarbon to transition metal component of the Ziegler-Natta catalyst ranges preferably from about 0.001:1 to about 1:1.

The molecular weight of the polyethylene produced by the present invention can be controlled in any known manner, for example, by using hydrogen. The molecular weight control may be evidenced by an increase in the melt index ($I_2$) of the polymer when the molar ratio of hydrogen to ethylene in the polymerization medium is increased.

The molecular weight distribution of the polyethylene produced by the present invention is expressed by the melt flow ratio (MFR). Preferably, the polyethylenes have MFR values varying from about 24 to about 34, and have densities ranging from about 0.880 gm/cc to about 0.964 gm/cc.

The polyethylenes of the present invention may be fabricated into films by any technique known in the art. For example, films may be be produced by the well known cast film, blown film and extrusion coating techniques.

Further, the polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylenes herein and in evaluating the physical properties of the films of the examples.

a) Dart Impact is determined according to ASTM D-1709, Method A; with a 38.1 mm dart having a smooth phenolic head, and a drop height of 0.66 meter, Film thickness of about 1 mil;

b) Machine Direction Tear, $MD_{TEAR}$(g/mil); ASTM D-1922 c) Transverse Direction Tear, $TD_{TEAR}$(g/mil); ASTM D-1922 d) Density is determined according to ASTM D-4883 from a plaque made according to ASTM D1928;

e) Melt Index (MI), $I_2$, is determined in accord with ASTM D-1238, condition E, measured at 190° C., and reported as decigrams per minute;

f) High Load Melt Index (HLMI), $I_{21}$, is measured in accord with ASTM D-1238, Condition F, measured at 10.0 times the weight used in the melt index test, $I_2$, above;

g) Melt Flow Ratio (MFR)=$I_{21}/I_2$ or High Load Melt Index/Melt Index;

h) Ether Extractable: A powder polymer sample approximately 100 grams in size is obtained from the reactor prior to any compounding stage. The sample is placed in a tared extraction thimble and weighed to the nearest 0.1 mg. The extraction thimble containing the sample is then placed in a Soxhlet extractor and continuously extracted with ether for 6 hours. The extraction thimble containing the sample that has been extracted is then dried to a constant weight in a vacuum over a 2 hour time period. The ether extractable is then reported as the weight fraction of sample that dissolved in the ether normalized with respect to the original sample weight. For example, an Ether Extractable of 2% indicates that 2% by weight of the polymer was extracted by the ether; and i) n-Hexane Extractable—is determined in accordance with 21 CFR 177.1520 (Option 2). More particularly, an approximately 1 square inch film test specimen having a thickness ≦4 mils weighing 2.5±0.05 grams is placed into a tared sample basket and accurately weighed to the nearest 0.1 milligram. The sample basket containing the test specimen is then placed in a 2-liter extraction vessel containing approximately 1 liter of n-hexane. The basket is placed such that it is totally below the level of n-hexane solvent. The sample resin film is extracted for 2 hours at 49.5±0.5° C. and then the basket is raised above the solvent level to drain momentarily. The basket is removed and the contents are rinsed by immersing several times in fresh n-hexane. The basket is allowed to dry between rinsing. The excess solvent is removed by briefly blowing the basket with a stream of nitrogen or dry air. The basket is placed in the vacuum oven for 2 hours at 80±5° C. After 2 hours, it is removed and placed in a desiccator to cool to room temperature (about 1 hour). After cooling, the basket is reweighed to the nearest 0.1 milligram. The percent n-hexane extractable content is then calculated from the weight loss of the original sample.

The Ziegler-Natta catalyst used herein was prepared in accordance with Example 1-a of European Patent Application EP 0 703 246 A1.

The Ziegler-Natta catalyst was used in prepolymer form, in Examples 1–7 herein, and was prepared in accordance with Example 1-b of European Patent Application EP 0 703 246 A1. A prepolymer containing about 34 grams of polyethylene per millimole of titanium was thus obtained.

Polymerization Process

The polymerization process utilized in Examples 1–7 herein was carried out in a fluidized-bed reactor for gas-phase polymerization, consisting of a vertical cylinder of diameter 0.9 meters and height 6 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 290 psig to about 300 psig with an ascending fluidization speed, referred to herein as fluidization velocity, ranging from about 1.8 feet per second to about 2.0 feet per second.

Furthermore, in each of Examples 1–7, a Ziegler-Natta catalyst as described above, substantially free of any internal electron donor, in prepolymer form, is introduced intermittently into the reactor. The said catalyst contains magnesium, chlorine and titanium. The prepolymer form contains about 34 grams of polyethylene per millimole of titanium and an amount of tri-n-octylaluminum (TnOA) such that the molar ration. Al/Ti, is equal to about 1.1:1. In Example 8, the Ziegler-Natta catalyst substantially free of any internal electron donor is introduced directly into the reactor without having been formed into a prepolymer. The rate of introduction of the prepolymer or catalyst into the reactor is adjusted for each given set of conditions in achieving the desired production rate. During the polymerization, a solution of trimethylaluminum (TMA) in n-hexane, at a concentration of about 2 weight percent, is introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the catalyst or prepolymer feed rate (in moles of titanium per hour). Simultaneously, a solution of chloroform ($CHCl_3$) in n-hexane, at a concentration of about 0.5 weight percent, is introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the catalyst or prepolymer feed rate (in moles of titanium per hour).

Tetrahydrofuran (THF), when utilized in the following examples, was the external electron donor. A solution of THF in n-hexane, at a concentration of about 1 weight percent, can be introduced continuously into the line for recycling the gaseous reaction mixture. The feed rate of THF is expressed as a molar ratio of THF to titanium (THF/Ti), and is defined as the ratio of the THF feed rate (in moles of THF per hour) to the catalyst or prepolymer feed rate (in moles of titanium per hour).

The productivity of the catalyst or prepolymer (Productivity) is the ratio of pounds of polyethylene produced per pound of catalyst or prepolymer added to the reactor. The activity of the catalyst or prepolymer is expressed as grams of polyethylene per millimole titanium per hour per bar of ethylene pressure.

EXAMPLE 1
Preparation of LLDPE with TMA as Co-Catalyst and with THF as External Electron Donor The process conditions are given in Table 1 and the resin properties are given in Table 2. The molar ratio of TMA to titanium was 7. The molar ratio of $CHCl_3$ to titanium was 0.06. The process was conducted with the addition of tetrahydrofuran (THF) as an external electron donor at a molar ratio of THF to titanium of 3. 1-Hexene was used as comonomer. Under these conditions a linear polyethylene free from agglomerate was withdrawn from the reactor at a rate of 206 lb/h (pounds per hour). The productivity of the catalyst was 179 pounds of polyethylene per pound of prepolymer which corresponds to an activity of 261 grams polyethylene per millimole titanium per hour per bar of ethylene partial pressure.

The linear polyethylene had a density of 0.918 g/cc and a melt index $MI_{2.16}$, $I_2$, of 0.9 dg/min. The Melt Flow Ratio, $I_{21}/I_2$, was 30 and the ether extractables were 2.8% by weight. The dart impact was 530 g/mil and the $MD_{TEAR}$ and $TD_{TEAR}$ were 410 g/mil and 540 g/mil, respectively.

EXAMPLE 2 (COMPARATIVE)
Preparation of Linear Low Density Polyethylene (LLDPE) with TMA as co-catalyst The process conditions are given in Table 1 and the resin properties are given in Table 2. The molar ratio of trimethylaluminum (TMA) to titanium was 3. The molar ratio of $CHCl_3$ to titanium was 0.03. The process was conducted without the addition of an external electron donor. 1-Hexene was used as comonomer. Under these conditions a linear polyethylene free from agglomerate was withdrawn from the reactor at a rate of 150 lb/h. The productivity of the catalyst was 375 pounds of polyethylene per pound of prepolymer which corresponds to an activity of 1154 grams of polyethylene per millimole of titanium per hour per bar of ethylene partial pressure.

The linear polyethylene had a density of 0.918 g/cc and a melt index $MI_{2.16}$, $I_2$, of 0.9 dg/min. The Melt Flow Ratio, $I_{21}/I_2$, was 33 and the ether extractables were 4.8% by weight. The dart impact was 200 g/mil and the $MD_{TEAR}$ and $TD_{TEAR}$ were 450 g/mil and 500 g/mil, respectively.

EXAMPLE 3 (COMPARATIVE)
Preparation of LLDPE with TEAL as Co-Catalyst and with THF as External Electron Donor The process conditions are given in Table 1 and the resin properties are given in Table 2. The molar ratio of triethylaluminum (TEAL) to titanium was 7. The molar ratio of $CHCl_3$ to titanium was 0.06. The molar ratio of THF to titanium was 3. 1-Hexane was used as comonomer. Under these conditions a linear polyethylene free from agglomerate was withdrawn from the reactor at a rate of 197 lb/h. The productivity of the catalyst was 122 pounds of polyethylene per pound of prepolymer which corresponds to an activity of 168 grams polyethylene per millimole titanium per hour per bar of ethylene partial pressure.

The linear polyethylene had a density of 0.918 g/cc and a melt index $MI_{2.16}$, $I_2$, of 0.9 dg/min. The Melt Flow Ratio, $I_{21}/I_2$, was 31 and the ether extractables were 3.6% by weight. The dart impact was 260 g/mil and the $MD_{TEAR}$ and $TD_{TEAR}$ were 430 g/mil and 560 g/mil, respectively.

EXAMPLE 4 (COMPARATIVE)
Preparation of LLDPE with TEAL as Co-Catalyst and with THF as External Electron Donor The process conditions are given in Table 1 and the resin properties are given in Table 2. The molar ratio of TEAL to titanium was 13. The molar ratio of $CHCl_3$ to titanium was 0.06. The molar ratio of THF to titanium was 3. 1-Hexene was used as comonomer. Under these conditions a linear polyethylene free from agglomerate was withdrawn from the reactor at a rate of 207 lb/h. The productivity of the catalyst was 150 pounds of polyethylene per pound of prepolymer which corresponds to an activity of 216 grams polyethylene per millimole titanium per hour per bar of ethylene partial pressure.

The linear polyethylene had a density of 0.918 g/cc and a melt index $MI_{2.16}$, $I_2$, of 0.9 dg/min. The Melt Flow Ratio, $I_{21}/I_2$, was 32 and the ether extractables were 4.0% by weight. The dart impact was 190 g/mil and the $MD_{TEAR}$ and $TD_{TEAR}$ were 416 g/mil and 571 g/mil, respectively.

TABLE 1

Reactor Conditions for Examples 1 through 4

| | Example | | | |
|---|---|---|---|---|
| | 1 | 2 | 3 | 4 |
| Reactor Pressure (psig) | 295 | 290 | 297 | 296 |
| Reactor Temperature (° C.) | 86 | 84 | 86 | 86 |
| Fluidization Velocity (ft/sec) | 1.94 | 1.79 | 1.94 | 1.93 |
| Fluidized Bulk Density (lb/ft$^3$) | 15.8 | 17.0 | 15.6 | 15.9 |
| Reactor Bed Height (ft) | 11 | 9.4 | 11 | 11 |
| Ethylene (C$_2$) (mole %) | 28 | 38 | 28 | 28 |
| H$_2$/C$_2$ (molar ratio) | 0.152 | 0.178 | 0.160 | 0.134 |
| 1-Hexene/C$_2$ (molar ratio) | 0.165 | 0.191 | 0.168 | 0.165 |
| Co-catalyst | TMA | TMA | TEAL | TEAL |
| Al/Ti (molar ratio) | 7 | 3 | 7 | 13 |
| External Electron Donor | THF | — | THF | THF |
| THF/Ti (molar ratio) | 3 | — | 3 | 3 |
| CHCl$_3$/Ti | 0.06 | 0.03 | 0.06 | 0.06 |
| Production Rate (lb/h) | 206 | 150 | 197 | 207 |
| Space Time Yield (lb/h-ft$^3$) | 4.05 | 3.59 | 3.80 | 4.08 |
| Productivity (mass ratio) | 179 | 375 | 122 | 150 |
| Activity (g PE/mmoleTi-h-bar$_{ethylene}$) | 261 | 1154 | 168 | 216 |
| Residual Titanium (ppm) | 8.6 | 1.1 | 12.3 | 9.5 |

TABLE 2

Resin Properties for LLDPE prepared in Examples 1 through 4

| | Example | | | |
|---|---|---|---|---|
| | 1 | 2 | 3 | 4 |
| Density (g/cc) | 0.918 | 0.918 | 0.918 | 0.918 |
| Melt Index, I2, (dg/min) | 0.9 | 0.9 | 0.9 | 0.9 |
| Melt Flow Ratio (I21/I2) | 30 | 33 | 31 | 32 |
| Ether Extractable (wt %) | 2.8 | 4.8 | 3.6 | 4.0 |
| n-Hexane Extractable (wt %) | 1.6 | 3.0 | 2.4 | 2.5 |
| Dart Impact (g/mil) | 530 | 200 | 260 | 190 |
| MD$_{TEAR}$ (g/mil) | 410 | 450 | 430 | 416 |
| TD$_{TEAR}$ (g/mil) | 540 | 500 | 560 | 571 |

A review of the data shown in Tables 1 and 2 reveal the unexpectedly superior results obtained for the polyethylene produced utilizing the process of the present invention, as shown in Example 1. More particularly, as shown in Example 1, wherein TMA and an external electron donor such as THF are both utilized in the polymerization process, a polyethylene is produced having a level of Dart Impact Strength more than twice as great as the polyethylene produced in Example 2 wherein TMA is utilized but in the absence of an external electron donor. Furthermore, as shown in Examples 3 and 4 wherein TEAL is utilized instead of TMA as co-catalyst, even together with an external electron donor, the resultant polyethylene has a Dart Impact Strength less than half that of the polyethylene produced in accordance with the process of the present invention as shown in Example 1. In addition to the foregoing, it will be noted from the data in Table 2 that the polyethylene produced in accordance with the present invention utilizing the combination of TMA and an external electron donor, is characterized by having a narrower molecular weight distribution, as evidenced by Melt Flow Ratio values, as compared with the polyethylene of Examples 2, 3 and 4. It is further to be noted that the extractable content of the polyethylene of the present invention (Example 1) is significantly lower than the extractable content of any of the comparative polyethylenes of Examples 2, 3 and 4. It is further to be noted that other physical properties of the polyethylenes of Examples 1, 2, 3 and 4 are substantially similar.

EXAMPLES 5–7

The following Examples 5, 6 and 7 are intended to demonstrate that similar results are obtainable when using olefins such as 1-butene, 1-pentene and 1-hexene as the comonomer with ethylene.

EXAMPLE 5

Preparation of a 0.908 Density LLDPE with TMA as Co-Catalyst, with THF as External Electron Donor and with 1-Hexene as Comonomer The process conditions are given in Table 3 and the resin properties are given in Table 4. The molar ratio of TMA to titanium was 6. The molar ratio of CHCl$_3$ to titanium was 0.06. The molar ratio of THF to titanium was 3. 1-Hexene was used as comonomer. Under these conditions a linear polyethylene free from agglomerate as withdrawn from the reactor at a rate of 196 lb/h. The productivity of the catalyst was 168 pounds of polyethylene per pound of prepolymer which corresponds to an activity of 259 grams polyethylene per millimole titanium per hour per bar of ethylene partial pressure.

The linear polyethylene had a density of 0.908 and a melt index MI$_{2.16}$, I$_2$, of 0.6 dg/min. The Melt Flow Ratio, I$_{21}$/I$_2$, was 34 and the ether extractables were 5.2% by weight. The dart impact was greater than 1500 g/mil and the MD$_{TEAR}$ and TD$_{TEAR}$ were 700 g/mil and 750 g/mil, respectively.

EXAMPLE 6

Preparation of a 0.908 Density LLDPE with TMA as Co-Catalyst, with THF as External Electron Donor and with 1-Pentene as Comonomer The process conditions are given in Table 3 and the resin properties are given in Table 4. The molar ratio of TMA to titanium was 7. The molar ratio of CHCl$_3$ to titanium was 0.06. The molar ratio of THF to titanium was 3. Under these conditions a linear polyethylene free from agglomerate was withdrawn from the reactor at a rate of 200 lb/h. The productivity of the catalyst was 129 pounds of polyethylene per pound of prepolymer which corresponds to an activity of 239 grams polyethylene per millimole titanium per hour per bar of ethylene partial pressure.

The linear polyethylene had a density of 0.908 and a melt index MI$_{2.16}$, I$_2$, of 0.5 dg/min. The Melt Flow Ratio, I$_{21}$/I$_2$, was 31 and the ether extractables were 3.1% by weight.

EXAMPLE 7

Preparation of a 0.908 Density LLDPE with TMA as Co-Catalyst, with THF as External Electron Donor and with 1-Butene as Comonomer The process conditions are given in Table 3 and the resin properties are given in Table 4. The molar ratio of TMA to titanium was 7.5. The molar ratio of CHCl$_3$ to titanium was 0.06. The molar ratio of THF to titanium was 3. Under these conditions a linear polyethylene free from agglomerate was withdrawn from the reactor at a rate of 200 lb/h. The productivity of the catalyst was 98 pounds of polyethylene per pound of prepolymer which corresponds to an activity of 210 grams polyethylene per millimole titanium per hour per bar of ethylene partial pressure.

The linear polyethylene had a density of 0.908 and a melt index MI$_{2.16}$, I$_2$, of 0.4 dg/min. The Melt Flow Ratio, I$_{21}$/I$_2$, was 28 and the ether extractables were 1.9% by weight.

TABLE 3

Reactor Conditions for Examples 5 through 7

|  | Example | | |
|---|---|---|---|
|  | 5 | 6 | 7 |
| Reactor Pressure (psig) | 294 | 297 | 297 |
| Reactor Temperature (° C.) | 81 | 80 | 78 |
| Fluidization Velocity (ft/sec) | 1.96 | 1.97 | 1.93 |
| Fluidized Bulk Density (lb/ft$^3$) | 14.6 | 14.8 | 14.9 |
| Reactor Bed Height (ft) | 12 | 12 | 12 |
| Ethylene (C$_2$) (mole %) | 25 | 22 | 19 |
| H$_2$/C$_2$ (molar ratio) | 0.119 | 0.100 | 0.102 |
| 1-Butene/C$_2$ (molar ratio) | — | — | 0.672 |
| 1-Pentene/C$_2$ (molar ratio) | — | 0.447 | — |
| 1-Hexene/C$_2$ (molar ratio) | 0.211 | — | — |
| Co-catalyst | TMA | TMA | TMA |
| Al/Ti (molar ratio) | 6 | 7 | 7.5 |
| External Electron Donor | THF | THF | THF |
| THF/Ti (molar ratio) | 3 | 3 | 3 |
| CHCl$_3$/Ti | 0.06 | 0.06 | 0.06 |
| Production Rate (lb/h) | 196 | 200 | 200 |
| Space Time Yield (lb/h-ft$^3$) | 3.56 | 3.70 | 3.73 |
| Productivity (mass ratio) | 168 | 129 | 98 |
| Activity (g PE/mmoleTi-h-bar$_{ethylene}$) | 259 | 239 | 210 |
| Residual Titanium (ppm) | 8.5 | 10.6 | 14 |

TABLE 4

Resin Properties for LLDPE prepared in Examples 5 through 7

|  | Example | | |
|---|---|---|---|
|  | 5 | 6 | 7 |
| Density (g/cc) | 0.908 | 0.908 | 0.908 |
| Melt Index, I$_2$, (dg/min) | 0.6 | 0.5 | 0.4 |
| Melt Flow Ratio (I$_{21}$/I$_2$) | 34 | 31 | 28 |
| Ether Extractables (wt %) | 5.2 | 3.1 | 1.9 |
| n-Hexane Extractable (wt %) | 3.5 | 1.8 | 1.3 |
| Dart Impact (g/mil) | >1500 | >2000 | 950 |
| MD$_{TEAR}$ (g/mil) | 700 | 550 | 313 |
| TD$_{TEAR}$ (g/mil) | 750 | 470 | 323 |

A review of the data in Tables 3 and 4 allows the following observations to be made. As the olefin comonomer is reduced in length, for example 1-hexene to 1-pentene to 1-butene, the data shows that the molecular weight distribution as measured by melt flow rate (MFR) is decreased and the extractable content of the polyethylenes is also decreased.

EXAMPLE 8

Preparation of LLDPE with TMA as Co-Catalyst and with THF as External Electron Donor Utilizing a Ziegler-Natta Catalyst Added Directly to the Reactor The process of Example 1 is followed with the exception that the Ziegler-Natta catalyst is directly injected into the reactor without having been converted to prepolymer. A linear polyethylene is obtained.

EXAMPLES 9–12

Preparation of LLDPE with TMA as Co-Catalyst and with an External Electron Donor Utilizing a Ziegler-Natta Catalyst The process of Example 1 is followed with the exception that the external electron donor utilized is as follows:
Example 9 diethyl ether,
Example 10 dibutyl ether,
Example 11 dioctyl ether,
Example 12 tert-butyl methyl ether,
In each of the above Examples 9–12, a linear polyethylene is obtained.

Films prepared from the polyethylenes of the present invention are generally characterized as having improved strength properties which are particularly shown by the values of Dart Impact in Tables 2 and 4.

Articles such as molded items can also be prepared from the polyethylenes of the present invention.

It should be clearly understood that the forms of the invention herein described are illustrative only and are not intended to limit the scope of the invention. The present invention includes all modifications falling within the scope of the following claims.

We claim:

1. A process for polymerizing ethylene and/or ethylene and at least one more more other olefin(s) comprising contacting, under polymerization conditions, the ethylene and/or ethylene and at least one or more olefin(s) with a Ziegler-Natta catalyst substantially free of internal electron donor, trimethylaluminum and at least one external electron donor compound containing at least one carbon-oxygen-carbon linkage (C—O—C) having the formula:

$$R^1\text{—O—}(R^2\text{—O})_n\text{—}R^3$$

wherein
n ranges from 0 to 30,
$R^1$, $R^2$ and $R^3$ independently contain from 1 to 30 carbon atoms and from 0 to 30 heteroatoms of an element, or mixtures thereof, selected from Groups 13, 14, 15, 16 and 17 of the Periodic Table of Elements as defined herein, and further wherein $R^1$, $R^2$ and/or $R^3$ can be linked and form part of a cyclic or polycyclic structure.

2. The process according to claim 1 wherein the at least one external electron donor compound containing at least one carbon-oxygen-carbon linkage (C—O—C) having the formula $R^1\text{—O(—}R^2\text{—O})_n\text{—}R^3$ is selected from the group consisting of tetrahydrofuran, diethyl ether, dipropyl ether, diisopropyl ethyl, dibutyl ether, tert-butyl methyl ether, dioctyl ether, trimethylene oxide and tetrahydropyran.

3. The process according to claim 2 wherein the external electron donor compound is selected from the group consisting of tetrahydrofuran, diethyl ether, dipropyl ether, diisopropyl ether, dibutyl ether and tert-butyl methyl ether.

4. The process according to claim 1 further comprising the presence of a halogenated hydrocarbon.

5. The process according to claim 4 wherein the halogenated hydrocarbon is chloroform.

6. The process according to claim 1 wherein the Ziegler-Natta catalyst comprises a transition metal compound wherein the metal is selected from metals of Groups 4, 5, 6, 7, 8, 9 and 10 of the Periodic Table of the Elements, as defined herein.

7. The process according to claim 6 wherein the metal of the transition metal compound is selected from the group consisting of titanium, zirconium, vanadium and chromium.

8. The process according to claim 7 wherein the metal of the transition metal compound is titanium.

9. The process according to claim 1 further comprising the presence of magnesium and chlorine incorporated in the Ziegler-Natta catalyst.

10. The process according to claim 6 further comprising the presence of magnesium and chlorine incorporated in the Ziegler-Natta catalyst.

11. The process according to claim 4 wherein the halogenated hydrocarbon is added in a molar ratio of halogenated hydrocarbon to transition metal component of the Ziegler-Natta catalyst ranging from 0.001:1 to about 1:1.

12. The process according to claim 1 wherein trimethylaluminum is added in a molar ratio of trimethylaluminum to transition metal component of the Ziegler-Natta catalyst ranging from about 1:1 to about 100:1.

13. The process according to claim 12 wherein the molar ratio of trimethylaluminum to transition metal component of the Ziegler-Natta catalyst ranges from about 1:1 to about 50:1.

14. The process according to claim 1 wherein the external electron donor compound is added in a molar ratio of external electron donor compound to transition metal component of the Ziegler-Natta catalyst ranging from about 0.01:1 to about 100:1.

15. The process according to claim 14 wherein the molar ratio of external electron donor compound to transition metal component of the Ziegler-Natta catalyst ranges from about 0.1:1 to about 50:1.

16. The process according to claim 1 wherein the polymerization conditions are gas phase.

17. The process according to claim 1 wherein the polymerization conditions are solution phase.

18. The process according to claim 1 wherein the polymerization conditions are slurry phase.

19. The process according to claim 1 wherein the at least one or more other olefin(s) is an olefin having 3 to 16 carbon atoms.

20. The process according to claim 19 wherein the at least one or more other olefin(s) is selected from the group consisting of 1-octene, 1-hexene, 4-methylpent-1-ene, 1-pentene, 1-butene and propylene.

21. The process according to claim 1 wherein the copolymer resulting from the polymerization of ethylene and at least one or more other olefin(s) comprises ethylene in an amount of at least about 70% by weight of the copolymer.

22. The process according to claim 1 wherein the Ziegler-Natta catalyst comprises titanium, magnesium and chlorine.

23. The process according to claim 22 further comprising the presence of a halogenated hydrocarbon.

24. The process according to claim 22 wherein the polymerization conditions are gas phase.

* * * * *

UNITED STATES PATENT AND TRADEMARK OFFICE
CERTIFICATE OF CORRECTION

PATENT NO. : 6,228,957 B1
DATED : May 8, 2001
INVENTOR(S) : Ford et al.

It is certified that error appears in the above-identified patent and that said Letters Patent is hereby corrected as shown below:

Column 16,
Line 12 (claim 1, line 2), "more more" should be -- or more --.

Signed and Sealed this

Sixth Day of November, 2001

*Attest:*

NICHOLAS P. GODICI
*Attesting Officer*    *Acting Director of the United States Patent and Trademark Office*